(12) United States Patent
Matsumoto et al.

(10) Patent No.: US 6,414,732 B1
(45) Date of Patent: Jul. 2, 2002

(54) COLOR FILTER LAYER AND REFLECTION TYPE MULTICOLOR FOR LIQUID CRYSTAL DISPLAY DEVICE

(75) Inventors: Fuminao Matsumoto; Akihiko Kanemoto, both of Yokohama; Tomohiro Inoue, Yamato; Hiroshi Kondo, Yokohama, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/334,648

(22) Filed: Jun. 17, 1999

(30) Foreign Application Priority Data

Jun. 17, 1998 (JP) .............................. 10-186864

(51) Int. Cl.⁷ .................... G02F 1/1335; G02F 1/1333; G02F 1/1343; G02F 1/1337
(52) U.S. Cl. ...................... 349/106; 349/110; 349/139; 349/123; 430/7; 430/201
(58) Field of Search ................... 349/106, 110, 349/123, 139; 430/7; 428/201

(56) References Cited

U.S. PATENT DOCUMENTS

| | | | | |
|---|---|---|---|---|
| 4,781,444 A | * | 11/1988 | Suginoya et al. ............ 359/273 |
| 5,248,576 A | * | 9/1993 | Yokoyama et al. ............ 430/7 |
| 5,395,678 A | * | 3/1995 | Matsushima et al. ........ 428/201 |
| 5,503,952 A | * | 4/1996 | Suzuki et al. ................... 430/7 |
| 5,554,466 A | * | 9/1996 | Matsushima et al. .......... 430/7 |
| 5,757,452 A | * | 5/1998 | Masaki et al. .............. 349/106 |
| 6,068,953 A | * | 5/2000 | Matsumoto et al. ........... 430/7 |

FOREIGN PATENT DOCUMENTS

JP          06-034809          2/1994

OTHER PUBLICATIONS

Abstract; Fumiaki Matsushima; "Production Of Color Filter"; JP 3–61400, Mar. 18, 1991.

* cited by examiner

Primary Examiner—William L. Sikes
Assistant Examiner—Julie Ngo
(74) Attorney, Agent, or Firm—Oblon, Spivak, McClelland, Maier & Neustadt, P.C.

(57) ABSTRACT

A color filter layer for a multicolor, liquid crystal display device which contains a plurality of color filters formed electrochemically on delineated stripes of transparent electrodes which are formed substantially parallel to each other on a transparent insulating substrate. The color filters are electrically conductive. A transparent resin material leveling layer fills gaps between the color filters.

26 Claims, 7 Drawing Sheets

COLOR FILTER LAYER AND REFLECTION TYPE MULTICOLOR FOR LIQUID CRYSTAL DISPLAY DEVICE

BACKGROUND OF THE INVENTION

1. Field of the Invention

The present invention relates to a color filter layer for a multicolor liquid crystal display device, and more particularly, to color filters formed self-aligned to stripes of transparent electrodes, with a leveling layer provided therebetween.

2. Description of the Background

Liquid crystal flat panel display devices are increasingly used because of their low consumption of electrical power and small size. Liquid crystal devices are widely used in information displays as well as various consumer products. Recently, the performance of larger liquid crystal display devices has approached that of cathode ray tubes. In addition, as the demand increases for color display of data, including images, this trend has also expanded into hand-held displays, which typically employ reflection type liquid crystal displays because they consume less power.

Liquid crystal display devices typically include, at a minimum, a layer of liquid crystals placed between a pair of parallel transparent substrates provided with alignment films, transparent electrodes, and a pair of polarizers disposed on outward surfaces of the substrates. Although plate glass sheets have mostly been used as the transparent substrate, plastic films are increasingly used as substrates in liquid crystal displays for hand-held devices, for example in cellular phones and portable pocket books. Typically, the plastic film substrates are relatively thin and of light weight, having a thickness of from 0.1 to 0.3 mm.

In order to display color, liquid crystal display devices are provided with color filters. Various methods of color filter fabrication are disclosed which include dyeing, dispersing pigments, electrodepositing, electrolyzing (or disrupting) micelles, printing and other similar methods. Using these methods, either red (R), green (G) or blue (B) filters may be formed on a transparent substrate.

These R, G and B filters are formed such that each is distributed substantially uniformly, which requires exacting positional control during the fabrication of the filters. The precision of the color filter alignment which is feasible is generally determined by the kind and the size of the substrate, for example, and the process equipment used for the fabrication. Precise alignment of plastic substrates is more difficult to attain than with glass substrates, because plastic substrates change in dimension with changes in temperature and humidity more than glass substrates. To form color filters on plastic substrates and to achieve sufficient precision for fabricating liquid crystal device with satisfactory device characteristics, it is desirable to use fabrication processes which do not require precise positional alignment, or to reduce the need for such stringent processes as much as possible.

Color filters can be formed through electrochemical processes on a pattern of linear transparent electrodes previously prepared on the substrate, using, for example, the above-mentioned micelle electrolysis. In addition, the layers of color filters may also be rendered electrically conductive by containing, or being admixed with conducting materials. As disclosed in Japanese Laid-Open Patent Publication No. 6-34809 (1994), the conductive color filter layers formed in this manner may serve not only as electrodes for carrying out the electrochemical process for forming the color filters, but also for driving liquid crystal devices.

Layers of color filters formed by electrochemical processes adhere rather weakly to the transparent electrode by physical adsorption. This often leads to problems such as the color layers peeling off during subsequent device fabrication processes. To obviate these problems, Japanese Laid-Open Patent Publication No. 3-61400 (1991) proposed a method in which a resin material is disposed on and penetrates into the color filter layer. This resin material is subsequently polymerized to form a polymer structure, thereby increasing the adhesion of the color filter layer.

A variety of reflection type liquid crystal devices have been developed recently, in addition to transmission type devices. It is desirable to form reflection type displays so that light incident on the display device is reflected back efficiently to an observer, and thereby provides a display which is as clear as possible. In general, therefore, black filters or a black matrix (BM) may not be used in reflection type display devices because they decrease the amount of light reflected from the display. This is in contrast with transmission type displays, in which a black matrix is commonly used to fill gaps between the RGB filters, and thereby enhances the contrast and color purity of the display.

It may be noted that the black matrix not only blocks light which bleeds through color filters, but also assists in leveling the surface of the display, which is defined by the face of color filters which are disposed towards a liquid crystal layer. Although the required surface flatness is dependent on the type of the liquid crystal display, it is typically on the order of 0.1 micron for super twisted-nematic (STN) type displays.

Surface flatness is of considerable importance for STN type displays. As noted above, conductive color filters formed by electrochemical processes may serve as electrodes for driving display devices. Therefore, it is not desirable to form a thick leveling layer on top of color filters, especially in the case of STN displays, because the thick leveling layers cause a decrease in potential voltage applied to the liquid crystal layer. Accordingly, it is desirable to form leveling layers only in gap portions between color filters, and either a thin or no leveling layer on top of the color filters.

As long as the device is fabricated on a glass substrate, patterning process steps can be employed to make this possible. Such patterning process steps may include, for example, conventional photolithography techniques using photo-curing acrylic resin for forming the leveling layer. However, this process is difficult to apply to a display device employing a plastic film substrate because of the difficulties mentioned above in precisely positioning the plastic material.

SUMMARY OF THE INVENTION

It is therefore an object of the present invention to provide a color filter layer and a fabrication method which overcome the problems noted above.

It is another object of the invention to provide a conductive color filter layer which is formed to have improved surface flatness without the need for stringent processes requiring precise positional alignment.

To achieve the foregoing and other objects, and to overcome the shortcomings discussed above, a color filter layer for a multicolor liquid crystal display device is prodded which includes a plurality of color filters. The color filters are each formed electrochemically to be electrically conductive, and are located on linear stripes of transparent electrodes, self-aligned and substantially parallel to linear stripes which are disposed on a transparent insulating substrate. In addition, a layer of transparent resin material is further provided as a leveling layer so as to at least fill the gaps between the color filters.

According to an alternative embodiment, a starting material for the transparent resin material has a resistivity value of at least of approximately $1 \times 10^9$ ohm·cm, and the thickness of the leveling layer is at most approximately 0.3 micron at the top of the color filter. The leveling layer is formed from a photosensitive transparent resin disposed on the color layer, and hardened by exposure to light incident-:from the backside of the transparent substrate. The backside of the transparent substrate is defined as the side of the substrate opposite that of the side on which the color filter layers and leveling layers are located.

In another embodiment, a reflection type multicolor liquid crystal display device is provided having an output panel which includes a plurality of liquid crystal cells, each cell including two transparent, insulating substrates arranged in a parallel and overlapping fashion, and each with a surface bearing at least one transparent electrode and a layer of liquid crystal material, in which the liquid crystal layer is contained between the insulating substrates. Each cell is capable of transmitting light upon the application of an electric field across the layer.

The transparent electrode of this invention is a conductive color filter formed electrochemically on linear stripes of transparent electrodes self-aligned to linear stripes on the substrate. In addition, a layer of transparent resin material is further provided as a leveling layer so as to at least fill gaps between the color filters.

Color filters can be formed without stringent processes such as precise positional alignment using the fabrication process disclosed herein. In addition, a leveling layer can be formed so as to at least fill gaps between the color filters. These processes are especially useful for plastic substrates, for which changes in dimension with changes in temperature and humidity are generally larger than those of glass substrates. Thereby, satisfactory multicolor display characteristics may be achieved, especially in reflection type liquid crystal devices with plastic substrates.

DESCRIPTION OF THE PREFERRED EMBODIMENTS

Figure 1:
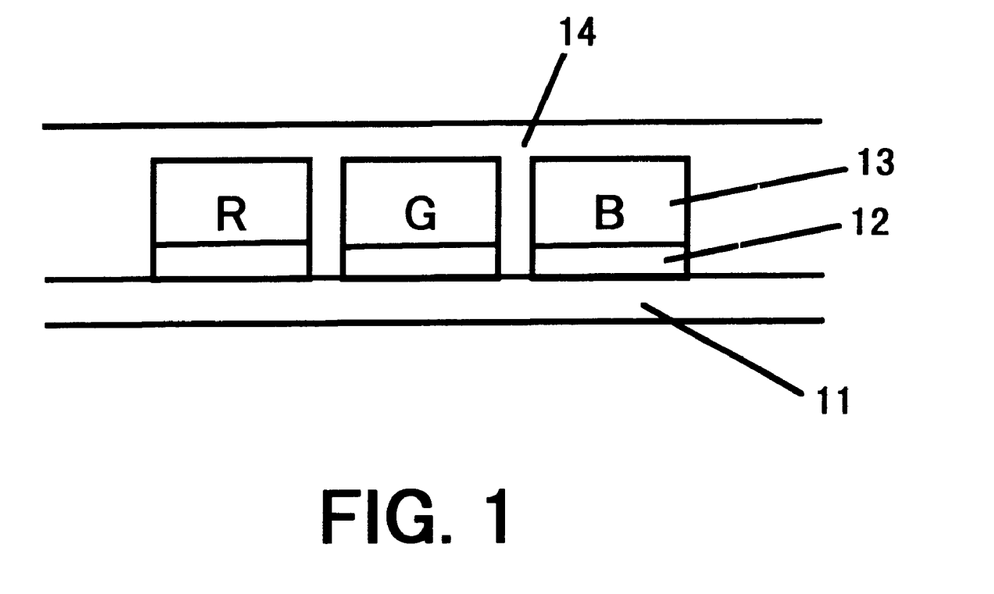
FIG. 1 is a cross-sectional view illustrating a color filter layer according to one embodiment of the invention disclosed herein, and includes a plurality of color filters on linear stripes of transparent electrodes formed on a transparent insulating substrate. A layer of transparent resin material is further provided as a leveling layer to fill gaps between the color filters.

FIG. 1 illustrates an embodiment of the color filter layers disclosed herein. The color filters 13 are each formed to be electrically conductive and located on linear stripes of transparent electrodes 12 which are formed substantially parallel to each other on a transparent insulating substrate 11. These :color filters are formed electrochemically on stripes of transparent electrodes self-aligned to linear stripes on the substrate.

The color filters are strengthened by a resin material. The resin material is introduced into the filter layer by impregnating the pores of the filter layer with a diluted solution of the resin material, or with a starting material for the resin, which is then subsequently cured. In addition, a layer composed of transparent resin material is further provided as a leveling layer 14 over the entire substrate structure, including the color filters, so as to at least fill gaps between the color filters. Illustrative examples of suitable transparent resin materials include, but are not limited to, acrylic resins, epoxy resins, polyimide resins, polyvinyl acetate resins, and polymethyl methacrylate resins. It is preferred in the present invention that the transparent resin material is thixotropic, to effectively level the surface of the color filter layer.

The transparent resin material may be applied as a solution of a starting material. The starting material may be, for example, a monomer, oligomer, prepolymer, or polymer which can be hardened to form the transparent resin material by heating, exposure to moisture, or exposure to electromagnetic radiation, or any combination thereof.

Since the color filters are electrically conductive, the overlying layer of the transparent resin material has to have a resistivity value large enough to prevent a short circuit between the color filters. The resistivity may be $10^9$, $10^{10}$, $10^{11}$, $10^{12}$, $10^{13}$, $10^{14}$, $10^{15}$ or $10^{16}$ ohm·cm, including all values and subranges therebetween. The resistivity value is preferably at least $10^9$ ohm·cm, more preferably at least $10^{13}$ ohm·cm.

The layer overlying the color filter has to be thin enough to prevent an undesirable reduction in the potential voltage applied to the liquid crystal layer, such that the liquid crystal layer cannot be activated. The thickness of the layer overlying the color filter is preferably at most 0.3 micron, more preferably at most 0.1 micron.

Further, using a photosensitive transparent resin material through appropriate process steps allows the leveling layer to be formed only over the area in which leveling the surface is required, but not over areas in which wire connections to peripheral circuitry may be made. This provides advantages in subsequent device fabrication process steps.

Still further, by using a photo-curing, transparent resin material and exposing the resin material to ultraviolet light incident from the backside of the transparent substrate, using the color filter layers as a mask, the leveling layer can be formed only in gaps between the color filters.

Color filters can be made using the fabrication method disclosed herein, without requiring stringent processes such as precise positional alignment. Consequently, these fabrication processes can be applied to display devices having a glass substrate. Moreover, these processes are especially useful for display devices having plastic substrates, for which changes in dimension with changes in temperature and humidity are generally larger than those of glass substrates.

Having generally described this invention, a further understanding can be obtained by reference to certain specific examples which are provided herein for purposes of illustration only, and are not intended to be limiting unless otherwise specified.

EXAMPLES

Example 1

A color filter layer for a liquid crystal display device, as shown in FIG. 1, was fabricated as follows.

A conductive transparent film, composed of a transparent insulating substrate 11 of polyethersulfone and at least one conductive layer 12 of indium tin oxide (ITO) (commercially available as FST-5340 from Sumitomo Bakelite Co.), was selected as a substrate.

A photoresist layer (not shown) was disposed on the entire surface of the FST-5340 transparent film and predetermined portions of the photoresist layer were removed through conventional photolithography processes to form a photoresist pattern. Using the photoresist pattern as a mask, predetermined portions of the conductive layer 12 on the transparent film were removed from the substrate 11 through conventional photolithography processes, for example, masking and etching operations, to thereby form 960 linear stripes of transparent electrodes 12, having a width of 90 microns and a pitch of 110 microns, as illustrated in FIG. 1.

The film prepared by this process was immersed into a micelle solution composed of hydrophobic red pigments, electrically conductive particles, surfactants and supporting electrolytes. By applying a potential voltage to every third electrode stripe in the micelle solution, a red color filter layer R, having a thickness of approximately 0.5 microns, was formed on the selected electrode stripes. The entire film was then thoroughly rinsed with distilled water and dried at 120° C. Similarly, green and blue color filters were formed by applying a potential to the remaining electrode stripes, with the exception that hydrophobic green or blue pigments, respectively, were employed. The resulting plastic color filter layer for a liquid crystal device consisted of alternating red, green and blue color filter layers. These color filter layers were rendered electrically conductive by dispersing ITO particles in them.

To form a leveling layer 14, a solution of 5% by weight of a thermosetting acrylic resin in butyl cellosolve was spin-coated onto the entire surface of the film structure, then hardened at 150° C. Since the color filter layer formed as above has a porous structure, the low viscosity solution of acrylic resin in cellosolve (i.e., 5 cP of viscosity) penetrated the filter layer, which strengthened the filter layer after curing. The resulting acrylic resin leveling layer had a thickness of at most 0.1 micron at the top of the color filter, while the thickness of the acrylic resin layer in the gaps between the color filters was approximately 0.3 micron. In addition, a depression in the leveling layer with a depth of approximately 0.4 micron was confirmed between the color filters.

Alternately, a solution of 30% by weight of thermosetting acrylic resin in butyl cellosolve was spin-coated on the entire surface of the film structure, followed by pre-baking at 80° C. on a hot plate and hardening at 150° C. in an oven. Since the more concentrated solution of acrylic resin in butyl cellosolve was more viscous (i.e., 40 cP of viscosity), layer 14 was more level during the processes of spin-coating and pre-baking. Consequently, using the 30 weight % solution of acrylic resin in butyl cellosolve, the depth of the depression of the leveling layer 14, between the color filter layers, was only approximately 0.1 micron.

Example 2

Color filters consisting of red, green and blue conductive color filter layers were fabricated on linear transparent electrode stripes on an FST-5340 film, as in Example 1.

As starting materials for forming a leveling layer 14, acrylic resin materials were selected from those having a resistivity value ranging from $10^7$ to $10^{16}$ ohm·cm. A leveling layer 14 was formed by spin-coating a solution of 5% by weight of thermosetting acrylic resin in butyl cellosolve onto the entire surface of the film structure, followed by hardening of the leveling layer at 150° C.

Figure 2:
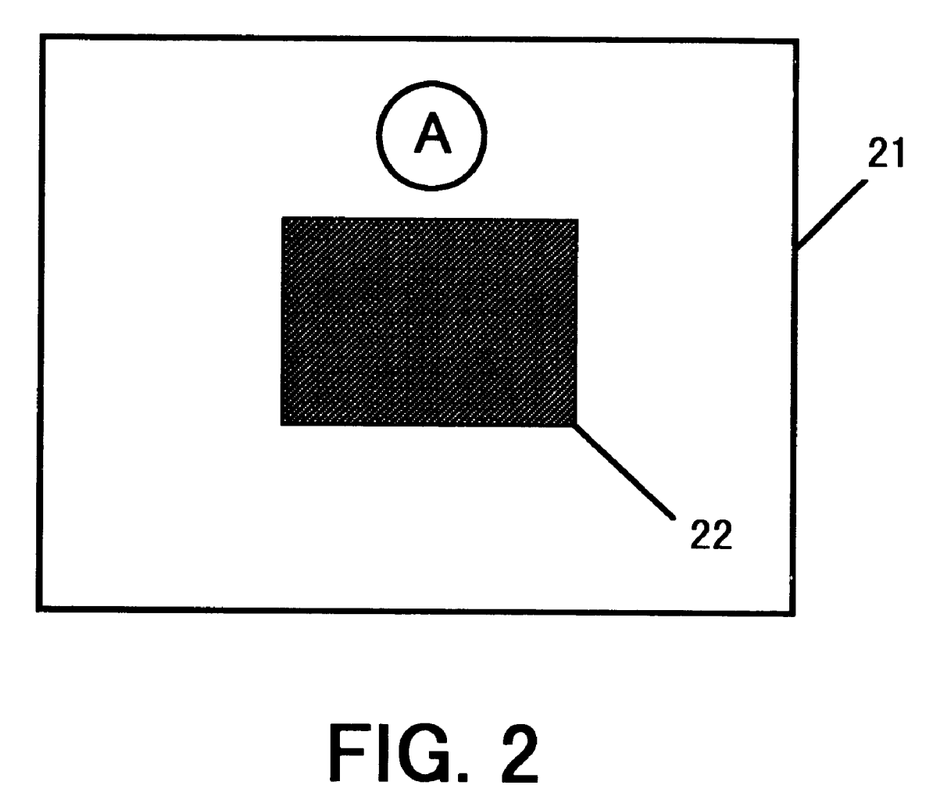
FIG. 2 is a top view of a liquid crystal display device disclosed herein, in which a black pattern is provided on a display panel and an area "A" is further provided so as to be located next to, and on the same linear electrode as that of the black pattern, as described in Example 2.

STN type liquid crystal display panels were fabricated to have a duty ratio of 1/240, using color filters in which the overlying leveling layer 14 had varying resistivity values. During the fabrication, a black pattern 22 was provided on a center portion of the display panel 21 as shown in FIG. 2, and an area designated as "A" was further provided nearby, located on the same linear electrode as that of the black pattern 22.

Figure 3:
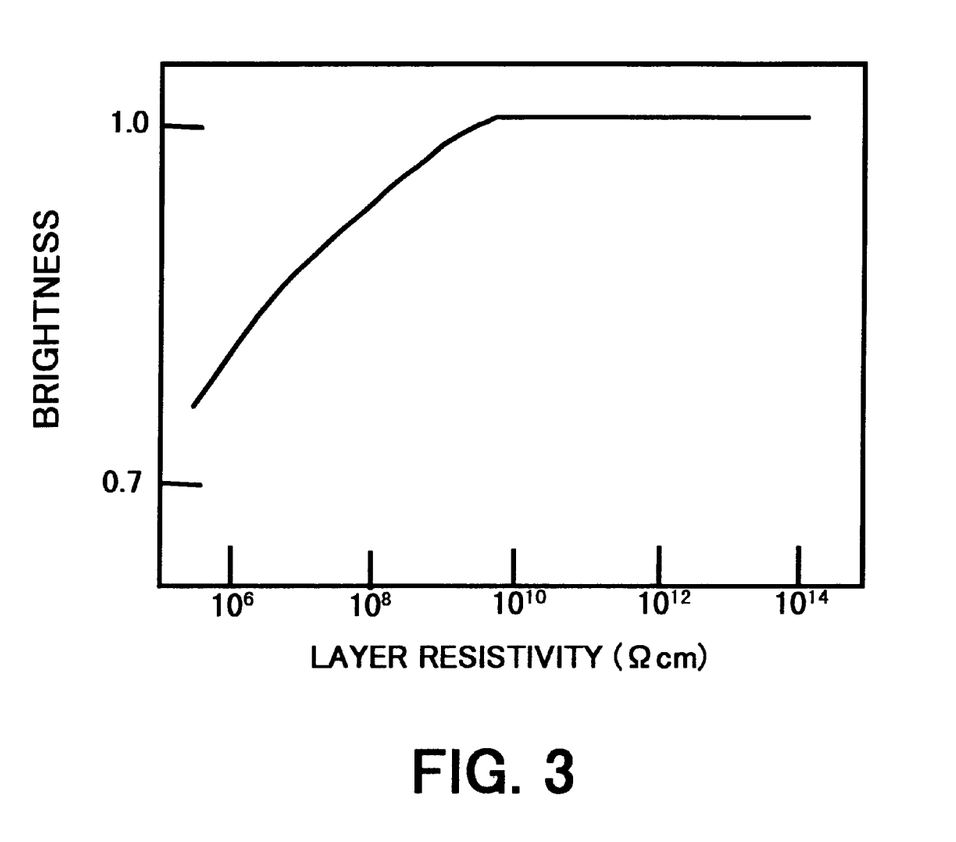
FIG. 3 is a graph showing the relation between the brightness and resistivity values of acrylic resin starting materials used to form a leveling layer, as described in Example 2.

The optical density in the area "A" was measured for sample display panels having varying resistivity values for layer 14. The results are shown as a graph in FIG. 3, in which the brightness is defined by the ratio $Y/Y_0$ on the vertical axis, where Y and $Y_0$ are the measured brightness in the area "A" for the dark and bright display periods, respectively and the resistivity in ohm·cm on the horizontal axis. As shown in FIG. 3, a considerable decrease in the brightness $Y/Y_0$ was found for samples in which the resistivity value of layer 14 was less than $10^9$ ohm·cm. Consequently, starting materials for forming the leveling layer 14 preferably have a resistivity value of at least $10^9$ ohm·cm.

Example 3

Figure 4:
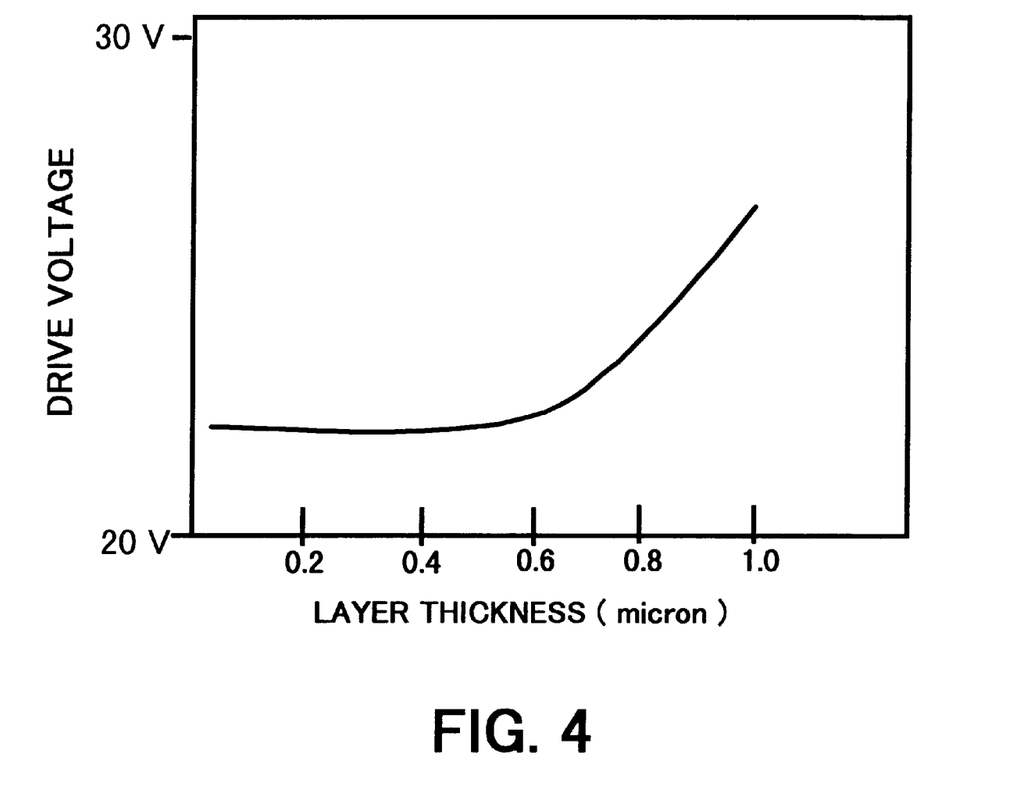
FIG. 4 is a graph showing the relation between the driving voltage and the thickness of the overlying leveling layer on top of the color filter, as described in Example 3.

An acrylic resin material, selected to have a resistivity value of $10^{16}$ ohm·cm was used for leveling layer 14. The leveling layer was formed by spin-coating a solution of 5% by weight of a thermosetting acrylic resin in butyl cellosolve onto the entire surface of the film structure. The leveling layer was then hardened at 150° C. STN type liquid crystal display panels, fabricated to have a duty ratio of 1/240, were then prepared with color filters having varying thicknesses of overlying leveling layer 14. The thickness of the leveling layer overlying the color filter layer was varied in a range from 0.1 to 1.0 microns. When these display panels were subsequently driven with various drive voltages to find suitable drive voltages, an increase in the drive voltage was found for the thickness of overlying leveling layer 14 of larger than 0.3 micron. The results are shown in FIG. 4 where the vertical axis is the driving voltage, and the horizontal axis is the thickness of the leveling layer. The driving voltage was defined as $V_{50}$ (or the voltage for which a 50% change of display panel transmittance was made) at a frame rate of 60. These results indicate that the thickness of overlying leveling layer 14 is preferably at most 0.3 micron for the display device of the present invention. The thickness of the leveling layer overlying the color filters may also be 0, 0.1, 0.2, 0.3, 0.4, 0.5, 0.6, 0.7, 0.8, 0.9, or 1.0 microns, including all values and subranges therebetween.

Example 4

Color filters consisting of red, green and blue conductive color filter layers were fabricated on linear transparent electrodes on an FST-5340 film, as in Example 1.

A solution of 5% by weight of a thermosetting acrylic resin in butyl cellosolve was subsequently spin-coated onto the entire surface of the film structure, then hardened at 150° C.

Figure 5:
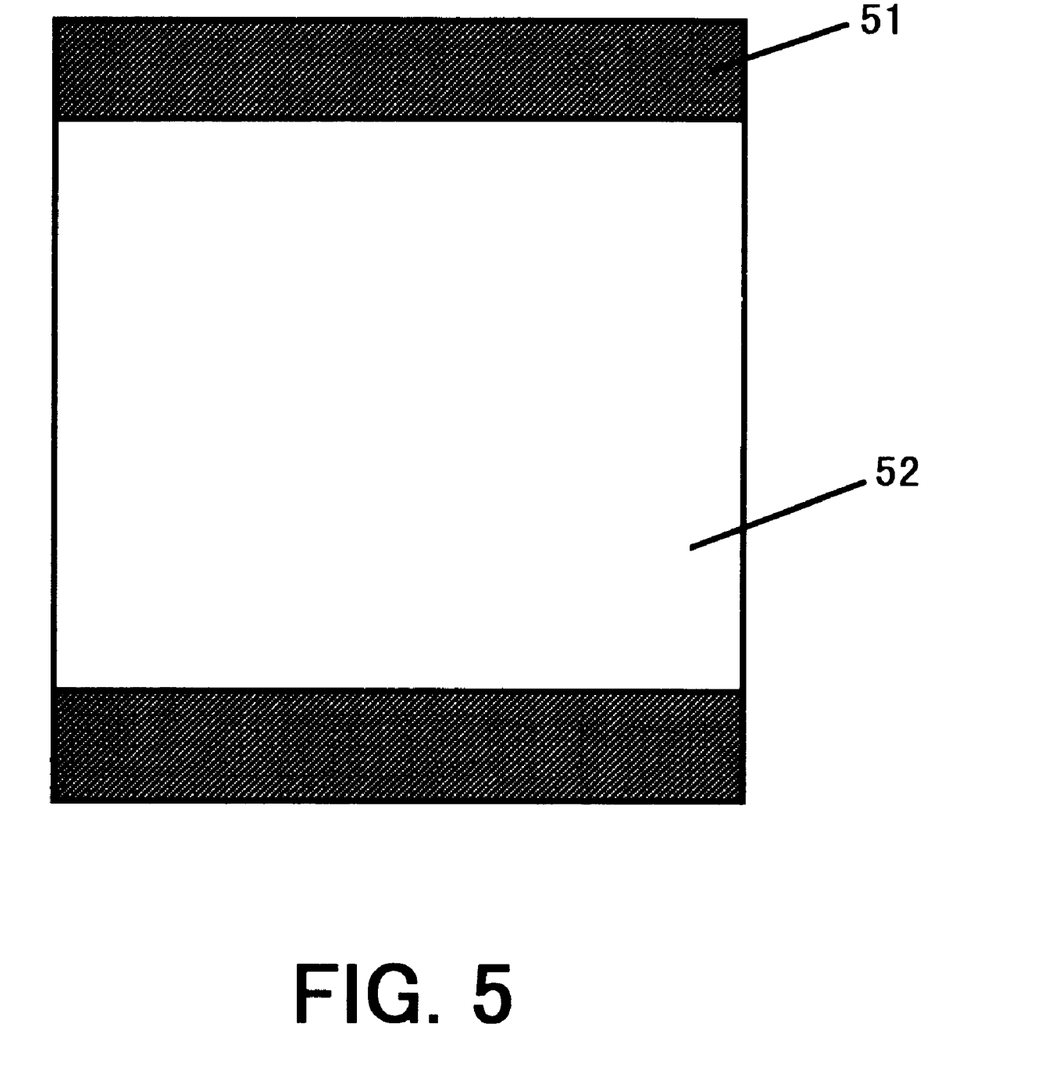
FIG. 5 is a top view of the substrate portion of a liquid crystal display device disclosed herein, illustrating the regions in which wire connections to peripheral circuitry are made as described in Example 4.

A solution of 30% by weight of a positive photosensitive transparent resin in diethylene glycol ethyl methyl ether was then spin-coated further thereon, followed by pre-baking at 90° C. on a hot-plate. Subsequently, portions of the coated surface, on which wire connections to peripheral circuitry would be made in further processing steps, were exposed to ultraviolet light, and developed with an aqueous tetramethylammonium hydride (TMAH) solution, whereby acrylic resin was removed on the exposed portions. Finally, the surface structure was thoroughly rinsed with distilled water and dried at 150° C. in an oven, thereby forming a leveling layer 14. As shown in FIG. 5, using this process, the leveling layer remained in area 52, but not in area 51 of the film surface where wire connections to if peripheral circuitry would be made. As a result, a process step for removing portions of the leveling layer can be eliminated, thus simplifying the fabrication process.

Example 5

Figure 6A:
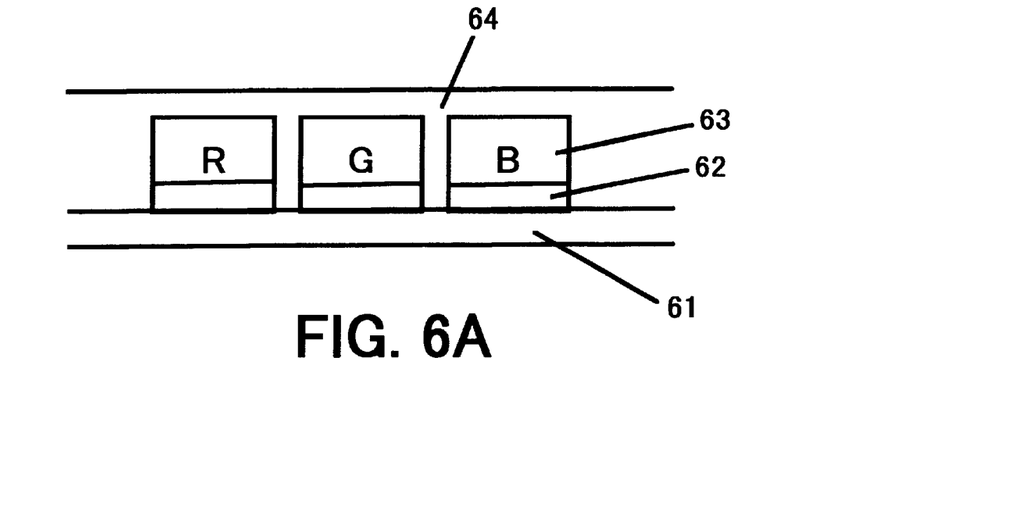
FIGS. 6A through 6C illustrate, in a series of cross-sectional views, a sequence of process steps utilized in fabricating a color film layer according to another embodiment of the invention disclosed herein, as described in Example 5.
Figure 6B:
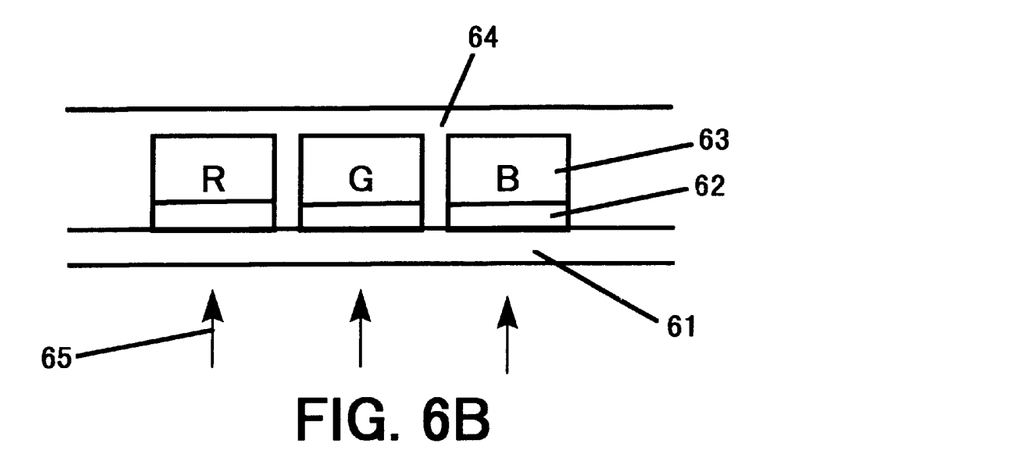
Figure 6C:
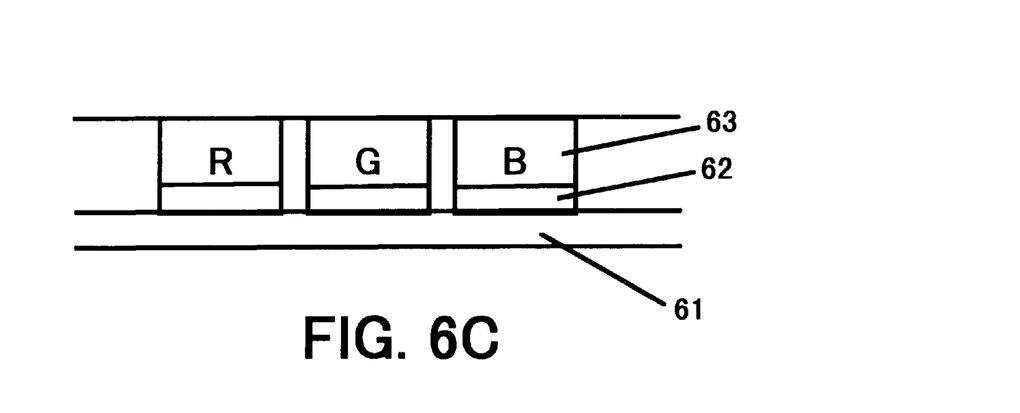

As shown in FIGS. 6A–C, color filters consisting of red, green and blue conductive color filter layers 63 were fabricated on linear transparent electrodes 62 on an FST-5340 film, as in Example 1.

A solution of 5% by weight of a thermosetting acrylic resin in butyl cellosolve was subsequently spin-coated onto the entire surface of the film structure, then hardened at 150° C.

As shown in FIG. 6A, a solution of 30% by weight of a negative photosensitive resin in diethylene glycol ethyl methyl ether was then spin-coated further thereon, followed by pre-baking at 90° C. on a hot-plate. The film was subsequently exposed to ultraviolet light 65 incident from the backside of the transparent substrate 61 (FIG. 6B), then developed with an approximately 1% aqueous sodium hydrogen carbonate solution, whereby a leveling layer 64 was formed (FIG. 6C).

The negative photosensitive resin was sensitive to light with a wavelength of approximately 365 nm. After exposing the negative photoresist to light, followed by developing, residual amounts of the resin layer remained on top of the previously formed filter layers. Although the color filters did not completely absorb 365 nm light, the thickness of the leveling layer between, as well as at the top of the color filters, could be adjusted by changing the amount of the light exposure.

The relationship between the amount of ultraviolet light exposure and either the surface flatness (or the depth of surface gradation) or the thickness of the leveling layer on top of the color filter obtained by experimentation is shown in Table 1.

TABLE 1

| Amount of light exposure (mJ/cm$^2$) | 50 | 100 | 200 | 300 |
|---|---|---|---|---|
| Surface flatness (micron) | 0.4 | 0.1 | 0.1 | 0 |
| Leveling layer thickness on color filter (micron) | 0.0 | 0.1 | 0.1 | 0.4 |

Example 6

Color filters consisting of red, green and blue conductive color filter layers were fabricated on linear transparent electrodes on an FST-5340 film, as in Example 1.

A solution of 10% by weight of a negative photosensitive transparent resin in diethylene glycol ethyl methyl ether was spin-coated thereon, followed by pre-baking at the 90° C. on a hot-plate. Subsequently, the film was exposed to ultraviolet light 65 as in FIG. 6(B), incident from the backside of the transparent substrate, then developed with an aqueous sodium hydrogen carbonate solution, in a manner similar to Example 5. The film was then post-baked at 150° C., whereby a leveling layer 64 was formed. The low viscosity negative photosensitive resin solution penetrated the color filters, and was thus useful not only for forming the leveling layer, but also for strengthening the color filter structure.

Example 7

Figure 7:
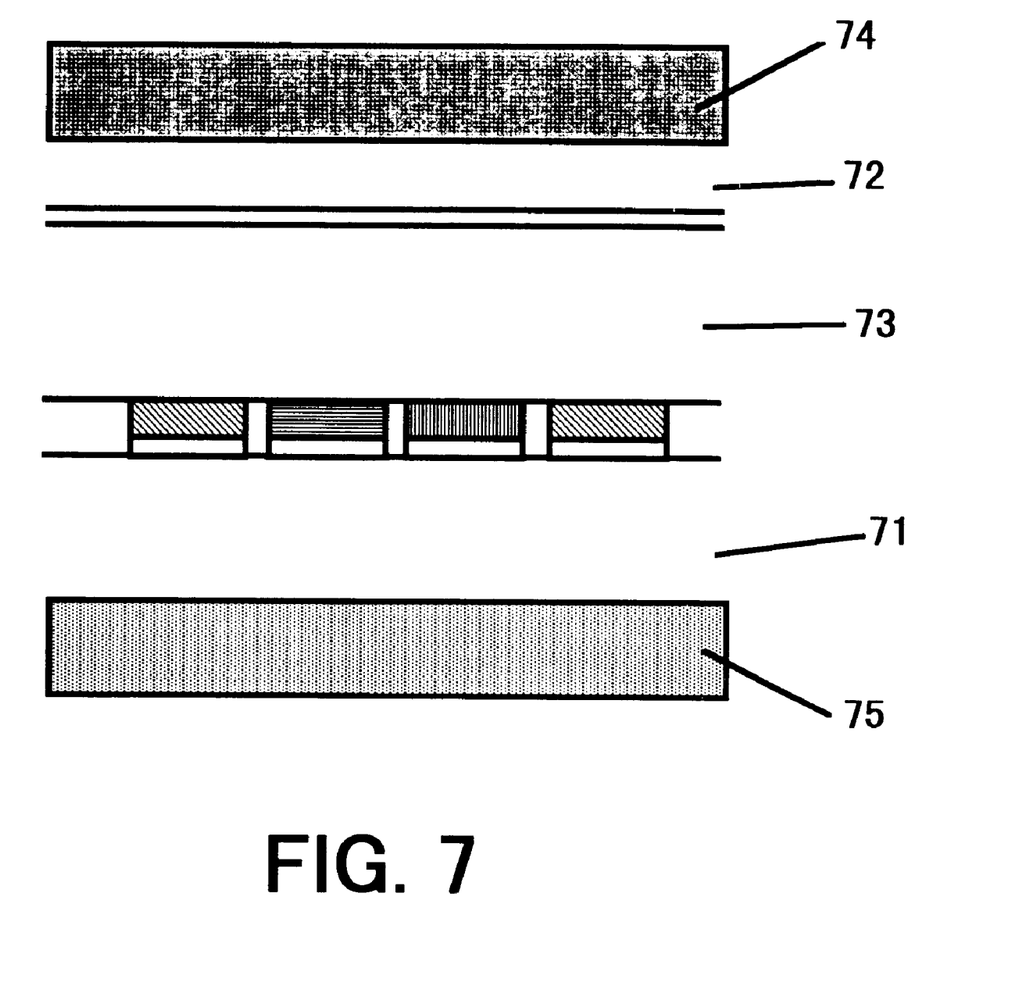
FIG. 7 is a cross-sectional view illustrating a liquid crystal display device incorporating the color filters disclosed herein.

A plurality of reflection type liquid crystal display devices were fabricated using color filter layers, as prepared in the examples above, and as illustrated by FIG. 7. The transparent substrates on which the conductive color filters of Examples 1 through 6 were respectively formed, were used as a first transparent substrate for the display device. As a first substrate, one of the transparent substrates 71 was also coated with polyimide (AL3046 from Japan Synthetic Rubber Co) to a thickness of 0.1 micron and subsequently alignment treated by rubbing it in a prearranged direction. A second substrate 72, having 240 linear stripes of transparent electrodes was separately prepared.

The first and second substrates were subsequently arranged apart from, and opposed to each other in a parallel fashion, to thereby constitute a liquid crystal display device with a twist angle of 240° and a cell spacing of approximately 7 microns. The assembly was subsequently filled with an STN type liquid crystal material 73 and then sealed, thus forming a liquid crystal display device. The display device was then connected to driving circuitry and further provided with a polarizer 74 on one outer face of the device, and a reflective polarizer with an attached phase difference, plate 75 on the other face. The resulting display device exhibited among other characteristics, satisfactory multicolor display properties such as high contrast and color purity.

This application is based on Japanese Patent Application No. 10-186864, filed with the Japanese Patent Office on Jun. 17, 1998, the entire contents of which are hereby incorporated by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A color filter layer for a multicolor liquid crystal display device, comprising:

a plurality of color filters; and a leveling layer, wherein each of said color filters is electrically conductive and electrochemically formed on each linear stripe of a plurality of transparent electrodes self-aligned on a transparent insulating substrate, and each of said electrodes is substantially parallel to each other electrode, and said leveling layer is composed of a transparent resin material which fills gaps between said color filters, and may optionally also cover the top of each of said color filters;

wherein said transparent resin material has a resistivity value of at least approximately $1 \times 10^9$ ohm·cm.

2. The color filter layer for a multicolor liquid crystal display device according to claim 1, wherein said transparent resin material comprises a photosensitive resin.

3. The color filter for a multicolor liquid crystal display device according to claim 2, wherein said transparent resin material is selected from the group consisting of an acrylic resin, an epoxy resin, a polyimide resin, a polyvinyl acetate resin, and a polymethyl methacrylate resin.

4. The color filter layer for a multicolor liquid crystal display device according to claim 2, wherein said transparent resin is hardened by being exposed to light incident from the side of said transparent insulating substrate opposite to a side of the substrate on which the plurality of color filters and the leveling layer are located.

5. The color filter layer for a multicolor liquid crystal display device according to claim 2, wherein said color filters are impregnated with and strengthened by said photosensitive resin used to form said leveling layer.

6. A color filter layer for a multicolor liquid crystal display device, comprising:

a plurality of color filters; and a leveling layer, wherein each of said color filters is electrically conductive and electrochemically formed on each linear stripe of a plurality of transparent electrodes self-aligned on a transparent insulating substrate, and each of said electrodes is substantially parallel to each other electrode, and said leveling layer is composed of a transparent resin material which fills gaps between said color filters, and may optionally cover the top of each color filter, and said transparent resin material has a resistivity value of at least approximately $1 \times 10^9$ ohm·cm, and said leveling layer has a thickness of up to approximately 0.3 micron at the top of each of said color filters.

7. The color filter layer for a multicolor liquid crystal display device according to claim 6, wherein said transparent resin material comprises a photosensitive resin.

8. The color filter layer for a multicolor liquid crystal display device according to claim 7, wherein said photosensitive resin is hardened by being exposed to light incident from the side of said transparent insulating substrate opposite to a side of the substrate on which the plurality of color filters and the leveling layer are located.

9. The color filter layer for a multicolor liquid crystal display device according to claim 7, wherein said color filters are impregnated with and strengthened by said photosensitive resin used to form said leveling layer.

10. A reflection type multicolor liquid crystal display device having an output panel comprising:

a plurality of liquid crystal cells, each cell containing two parallel and overlapping, transparent, insulating substrate layers with a layer of liquid crystalline material disposed therebetween, a surface of one of said insulating substrate layers contacting the liquid crystalline layer has a plurality of transparent electrodes located thereon, the cell being capable of transmitting light upon application of an electric field across the layer;

wherein each of said transparent electrodes is an electrically conductive color filter electrochemically formed on a linear stripe of a transparent electrode, self-aligned to said linear stripe; and a leveling layer comprising a transparent resin material is further provided which fills gaps between said transparent electrodes, and may optionally cover the top of said color filter;

wherein said transparent resin material has a resistivity value of at least approximately $10 \times 10^9$ ohm·cm.

11. The reflection type multicolor liquid crystal display device according to claim 10, wherein said transparent resin material comprises a photosensitive resin.

12. The reflection type multicolor liquid crystal display device according to claim 11, wherein said photosensitive resin is hardened by being exposed to light incident from the side of one of said transparent insulating substrate layers opposite to the side of the substrate on which the plurality of color filters and the leveling layer are located.

13. The reflection type multicolor liquid crystal display device according to claim 11, wherein said color filters are impregnated with and strengthened by said photosensitive resin used to form said leveling layer.

14. A reflection type multicolor liquid crystal display device having an output panel comprising:

a plurality of liquid crystal cells, each cell containing two parallel and overlapping, transparent, insulating substrate layers with a layer of liquid crystalline material disposed therebetween, a surface of one of said insulating substrate layers contacting the liquid crystalline layer has a plurality of transparent electrodes located thereon, the cell being capable of transmitting light upon application. of an electric field across the layer;

wherein each of said transparent electrodes is an electrically conductive color filter electrochemically formed on a linear stripe of a transparent electrode, self-aligned to said linear stripe; and a leveling layer comprising a transparent resin material is further provided which fills gaps between said transparent electrodes and may optionally cover the top of said color filter, and said transparent resin material has a resistivity value of at least approximately $10 \times 10^9$ ohm·cm, and said leveling layer has a thickness of at most approximately 0.3 micron at the top of said color filter.

15. The reflection type multicolor liquid crystal display device according to claim 14, wherein said transparent resin material comprises a photosensitive resin.

16. The reflection type multicolor liquid crystal display device according to claim 15, wherein said photosensitive resin is hardened by being exposed to light incident from the side of one of said transparent insulating substrate layers on which the color filter and the leveling layer are not formed.

17. The reflection type multicolor liquid crystal display device according to claim 15, wherein said color filter is impregnated with and strengthened by said photosensitive resin used to form said leveling layer.

18. A color filter layer for a multicolor liquid crystal display device, comprising:

a plurality of color filters; and a leveling layer, wherein each of said color filters is electrically conductive and electrochemically formed on each linear stripe of a plurality of transparent electrodes self-aligned on a transparent insulating substrate, and each of said electrodes is substantially parallel to each other electrode, and said leveling layer is composed of a transparent resin material which fills gaps between said color filters, and may optionally also cover the top of each of said color filters;

wherein the thickness of said leveling layer is up to approximately 0.3 microns at the top of each of said color filters.

19. The color filter layer for a multicolor liquid crystal display device according to claim 18, wherein said transparent resin material comprises a photosensitive resin.

20. The color filter for a multicolor liquid crystal display device according to claim 19, wherein said transparent resin is selected from the group consisting of an acrylic resin, an epoxy resin, a polyimide resin, a polyvinyl acetate resin, and a polymethyl methacrylate resin.

21. The color filter layer for a multicolor liquid crystal display device according to claim 19, wherein said photosensitive resin is hardened by being exposed to light incident from the side of said transparent insulating substrate opposite to a side of the substrate on which the plurality of color filters and the leveling layer are located.

22. The color filter layer for a multicolor liquid crystal display device according to claim 19, wherein said color filters are impregnated with and strengthened by said photosensitive resin used to form said leveling layer.

23. A reflection type multicolor liquid crystal display device having an output panel comprising:

a plurality of liquid crystal cells, each cell containing two parallel and overlapping, transparent, insulating substrate layers with a layer of liquid crystalline material disposed therebetween, a surface of one of said insulating substrate layers contacting the liquid crystalline layer has a plurality of transparent electrodes located thereon, the cell being capable of transmitting light upon application of an electric field across the layer;

wherein each of said transparent electrodes is an electrically conductive color filter electrochemically formed on a linear stripe of a transparent electrode, self-aligned to said linear stripe; and a leveling layer comprising a transparent resin material is further provided which fills gaps between said transparent electrodes, and may optionally cover the top of said color filter;

wherein the thickness of said leveling layer is up to approximately 0.3 micron at the top of said color filter.

24. The reflection type multicolor liquid crystal display device according to claim 23, wherein said transparent resin material comprises a photosensitive resin.

25. The reflection type multicolor liquid crystal display device according to claim 24, wherein said photosensitive resin is hardened by being exposed to light incident from the side of one of said transparent insulating substrate layers on which said color filter and the leveling layer are not formed.

26. The reflection type multicolor liquid crystal display device according to claim 24, wherein said color filter is impregnated with and strengthened by said photosensitive resin used to form said leveling layer.

* * * * *